US009582491B2

(12) United States Patent
Bernelas et al.

(10) Patent No.: US 9,582,491 B2
(45) Date of Patent: *Feb. 28, 2017

(54) CONTRACTION AWARE PARSING SYSTEM FOR DOMAIN-SPECIFIC LANGUAGES

(71) Applicant: International Business Machines Corporation, Armonk, NY (US)

(72) Inventors: Jean-Michel G. B. Bernelas, Nice (FR); Ulrich M. Junker, Biot (FR); Stephane Mery, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,415

(22) Filed: Apr. 13, 2016

(65) Prior Publication Data

US 2016/0232153 A1 Aug. 11, 2016

Related U.S. Application Data

(63) Continuation of application No. 14/686,998, filed on Apr. 15, 2015, now Pat. No. 9,367,290, which is a
(Continued)

(51) Int. Cl.
*G06F 9/45* (2006.01)
*G06F 17/27* (2006.01)
*G06F 9/44* (2006.01)

(52) U.S. Cl.
CPC .............. *G06F 17/274* (2013.01); *G06F 8/34* (2013.01); *G06F 8/37* (2013.01); *G06F 8/427* (2013.01);
(Continued)

(58) Field of Classification Search
CPC ............ G06F 8/427; G06F 8/433; G06F 8/436
See application file for complete search history.

(56) References Cited

U.S. PATENT DOCUMENTS

2007/0112556 A1 5/2007 Lavi et al.
2009/0306959 A1* 12/2009 Rappoport ............... G09B 7/02
704/2
(Continued)

OTHER PUBLICATIONS

Brillant Feuto, et al., "Domain Specific Language for Expressing Business Rules", University of Franche-Comte Besancon, France, <http://tesniere.univ-fcomte.fr/ressources/Publications/Feuto/VORTE_2013.pdf>.
(Continued)

*Primary Examiner* — Chameli Das
(74) *Attorney, Agent, or Firm* — Daniel R. Simek

(57) ABSTRACT

Aspects of the present invention disclose a method, computer program product, and system for parsing a domain-specific language (DSL) statement. The method includes one or more processors accessing a DSL statement that includes contracted phrases. The method further includes one or more processors identifying one or more contracted phrases in the DSL statement utilizing an annotated domain vocabulary for a DSL associated with the DSL statement and grammar rules for the DSL. The method further includes one or more processors determining expanded phrases corresponding to the identified one or more contracted phrases based on the annotated domain vocabulary and the grammar rules. The method further includes one or more processors creating an expanded abstract syntax tree (AST) that is representative of the DSL statement with the determined expanded phrases replacing the identified one or more contracted phrases.

17 Claims, 5 Drawing Sheets

Related U.S. Application Data continuation of application No. 14/538,959, filed on Nov. 12, 2014, now Pat. No. 9,361,075.

(52) U.S. Cl.
CPC ........ *G06F 17/271* (2013.01); *G06F 17/2755* (2013.01)

(56) References Cited

U.S. PATENT DOCUMENTS

| | | | |
|---|---|---|---|
| 2010/0088686 A1* | 4/2010 | Langworthy | G06F 8/41 717/143 |
| 2012/0254074 A1* | 10/2012 | Flinn | G06N 7/02 706/4 |
| 2013/0006954 A1* | 1/2013 | Nikoulina | G06F 17/2818 707/706 |
| 2013/0031529 A1* | 1/2013 | Bernelas | G06F 8/31 717/114 |
| 2013/0080152 A1* | 3/2013 | Brun | G06F 17/30666 704/9 |
| 2013/0151238 A1 | 6/2013 | Beaurpere et al. | |
| 2014/0059417 A1* | 2/2014 | Bernelas | G06F 17/241 715/230 |
| 2014/0156282 A1 | 6/2014 | Madere et al. | |
| 2014/0195306 A1 | 7/2014 | Bernelas et al. | |

OTHER PUBLICATIONS

Carbonell, Jaime G., "Discourse Pragmatics and Ellipsis Resolution in Task-Oriented Natural Language Interfaces", Carnegie Mellon University, Research Showcase @ CMU, Computer Science Department, School of Computer Science, 1983, pp. 164-168.

Metzler, et al., "Conjunction, ellipsis, and other discontinuous constituents in the constituent object parser", Information Processing and Management: an International Journal, vol. 26, Issue 1, 1990, pp. 53-71.

Van Deursen, et al., "Domain-Specific Language Design Requires Feature Descriptions", Journal of Computing and Information Technology—CIT 10, 2002, <http://homepages.cwi.nl/~paulk/publications/features.pdf>.

Yoshida, et al., "Predictive processing of syntactic structure: Sluicing and ellipsis in real-time sentence processing", © 2012 Psychology Press.

"UML Profiling and DSL", 18.0 user guide, Magic Draw® Architecture Made Simple, No Magic, Inc. 2014, <http://www.nomagic.com/files/manuals/MagicDraw%20UMLProfiling&DSL%20UserGuide.pdf>.

IBM Support Portal, "Decision Server Advanced Restricted V8.6 Technotes", made publicly available on Jun. 13, 2014.

IBM Support Portal, "IBM Decision Server Insights V8.6 Installation Guide", made publicly available on Jun. 13, 2014.

List of IBM Patents or Patent Applications Treated as Related, Filed Herewith.

Jean-Michel G.B. Bernelas et al., "Contraction Aware Parsing System for Domain-Specific Languages", U.S. Appl. No. 14/538,959, filed Nov. 12, 2014.

Jean-Michel G.B. Bernelas et al., "Contraction Aware Parsing System for Domain-Specific Languages", U.S. Appl. No. 14/686,998, filed Apr. 15, 2015.

* cited by examiner

CONTRACTION AWARE PARSING SYSTEM FOR DOMAIN-SPECIFIC LANGUAGES

STATEMENT ON PRIOR DISCLOSURES BY AN INVENTOR

Various aspects of the present invention have been disclosed in the products Decision Server Advanced Restricted V8.6, made publicly available on Jun. 13, 2014. This disclosure is submitted under 35 U.S.C. 102(b)(1)(A). The following documentation is provided in support of the disclosure available on Jun. 13, 2014:

(i) IBM Support Portal, *Decision Server Advanced Restricted V8.6 Technotes*; and (ii) *IBM Decision Server Insights V8.6 Installation Guide.*

BACKGROUND OF THE INVENTION

The present invention relates generally to the field of domain-specific languages, and more particularly to parsing domain-specific languages.

A domain-specific language (DSL) is a computer language specialized to a particular application domain. This is in contrast to a general-purpose language (GPL), which is broadly applicable across domains and lacks specialized features for a particular domain. DSLs provide a convenient way to instrument applications and engines. There are a wide variety of DSLs, ranging from widely used languages for common domains (e.g., HyperText Markup Language (HTML) for web pages), down to languages used by only a single piece of software. DSLs can be further subdivided by the kind of language and include domain-specific markup languages, domain-specific modeling languages (more generally, specification languages), and domain-specific programming languages. DSLs are capable of expressing complex condition-action rules and event-processing rules. The DSLs can support a rich domain vocabulary allowing the formulation of complex, nested expressions.

In computer science, an abstract syntax tree (AST), or syntax tree, is a tree representation of the abstract syntactic structure of source code written in a programming language. Each node of the tree denotes a construct occurring in the source code. The syntax is "abstract" in not representing every detail appearing in the real syntax. ASTs can also be used in program analysis and program transformation systems.

SUMMARY

Aspects of the present invention disclose a method, computer program product, and system for parsing a domain-specific language (DSL) statement. The method includes one or more processors accessing a DSL statement that includes contracted phrases. The method further includes one or more processors identifying one or more contracted phrases in the DSL statement utilizing an annotated domain vocabulary for a DSL associated with the DSL statement and grammar rules for the DSL. The method further includes one or more processors determining expanded phrases corresponding to the identified one or more contracted phrases based on the annotated domain vocabulary and the grammar rules. The method further includes one or more processors creating an expanded abstract syntax tree (AST) that is representative of the DSL statement with the determined expanded phrases replacing the identified one or more contracted phrases.

DETAILED DESCRIPTION

Embodiments of the present invention allow for a method for parsing domain-specific language (DSL) statements that is capable of recognizing certain kinds of shortened and contracted expressions and to expand the contracted into a form as prescribed by the DSL. A contracted DSL statement is identified and utilized to create an abstract syntax tree (AST) that contains nodes that correspond to the contracted expressions in the DSL statement. Then, the contracted AST is expanded into an AST that does not use contracted expressions and can be processed by an application or engine.

Some embodiments of the present invention recognize that expressiveness in DSL statements can lead to lengthy descriptions of rules, which can be difficult to read and edit. Other embodiments recognize that an AST that is based off of a contracted DSL statement may not be compatible with the applications and engines that are associated with the DSL. A contracted DSL statement is a DSL statement that includes shortened or contracted expressions. For example, a comparison DSL statement of "the price of the limousine is smaller than the price of the sports car" can correspond to contracted DSL statement of "the limousine is cheaper than the sports car."

Figure 1:
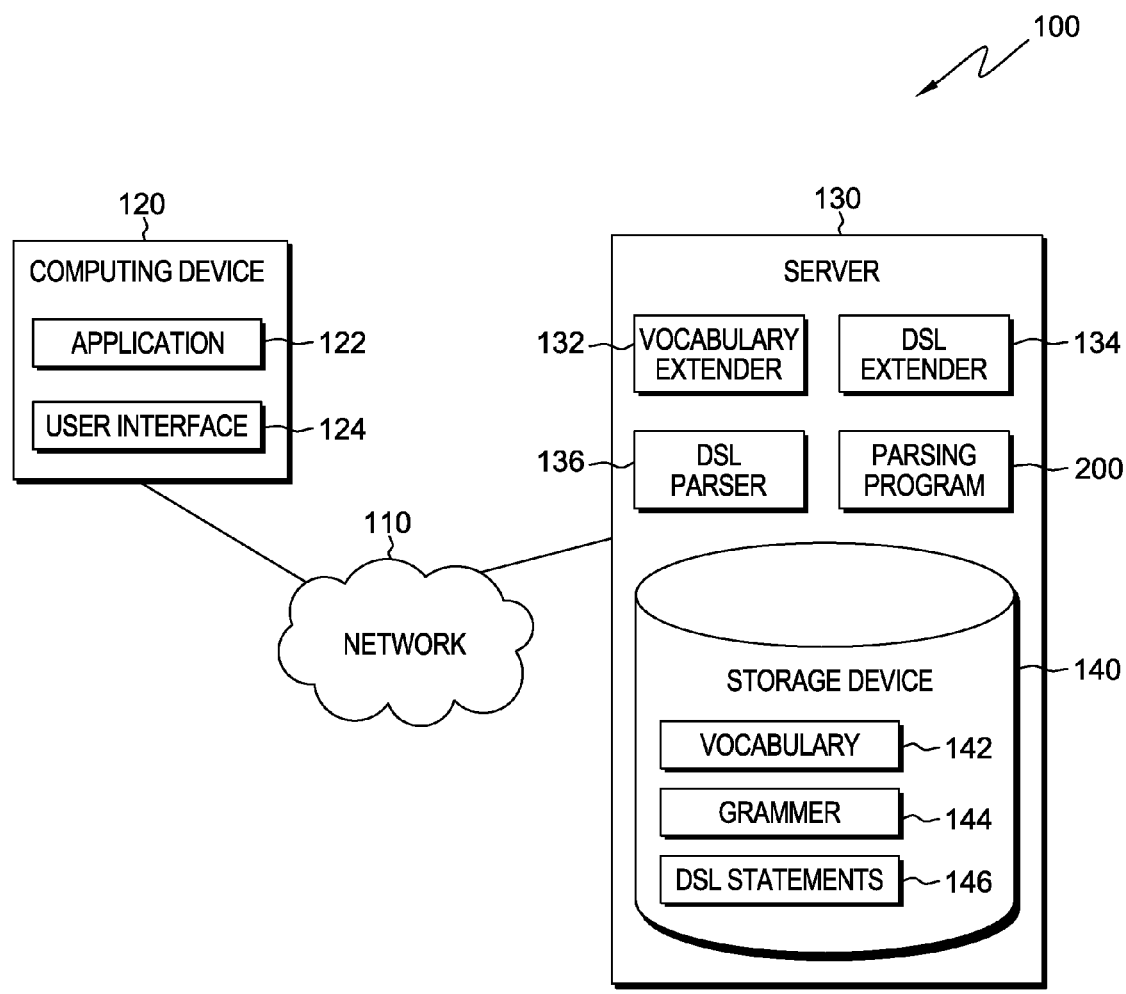
FIG. 1 is a functional block diagram of a data processing environment, in accordance with an embodiment of the present invention.

The present invention will now be described in detail with reference to the Figures. FIG. 1 is a functional block diagram illustrating data processing environment 100, in accordance with one embodiment of the present invention.

An embodiment of data processing environment 100 includes computing device 120 and server 130, interconnected over network 110. In an example embodiment, computing device 120 can communicate with server 130, via network 110, to send DSL statements to server 130 and access information that is stored on server 130. In one embodiment, computing device 120 and server 130 communicate through network 110. Network 110 can be, for example, a local area network (LAN), a telecommunications network, a wide area network (WAN) such as the Internet, or any combination of the three, and include wired, wireless, or fiber optic connections. In general, network 110 can be any combination of connections and protocols that will support communications between computing device 120 and server 130, in accordance with embodiments of the present invention.

In various embodiments of the present invention, computing device 120 may be a workstation, personal computer, personal digital assistant, mobile phone, or any other device capable of executing computer readable program instructions, in accordance with embodiments of the present invention. In general, computing device 120 is representative of any electronic device or combination of electronic devices capable of executing computer readable program instructions. Computing device 120 may include components as depicted and described in further detail with respect to FIG. 5, in accordance with embodiments of the present invention.

Computing device 120 includes application 122 and user interface 124. Application 122 is a software application that an individual utilizing computing device 120 can utilize (e.g., via user interface 124) to interface with server 130. In one embodiment, computing device 120 sends DSL statements to server 130 utilizing application 122.

User interface 124 is a program that provides an interface between a user of computing device 120 and a plurality of applications that reside on computing device 120. A user interface, such as user interface 124, refers to the information (such as graphic, text, and sound) that a program presents to a user and the control sequences the user employs to control the program. A variety of types of user interfaces exist. In one embodiment, user interface 124 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. The actions in GUIs are often performed through direct manipulation of the graphical elements.

In example embodiments, server 130 can be a desktop computer, a computer server, or any other computer systems known in the art. In certain embodiments, server 130 represents computer systems utilizing clustered computers and components (e.g., database server computers, application server computers, etc.) that act as a single pool of seamless resources when accessed by elements of data processing environment 100 (e.g., computing device 120). In general, server 130 is representative of any electronic device or combination of electronic devices capable of executing computer readable program instructions. Server 130 may include components as depicted and described in further detail with respect to FIG. 5, in accordance with embodiments of the present invention.

Server 130 includes vocabulary extender 132, DSL extender 134, DSL parser 136, storage device 140, and parsing program 200. Storage device 140 includes vocabulary 142, grammar 144, and DSL statements 146. Storage device 140 can be implemented with any type of storage device, for example, persistent storage 508, which is capable of storing data that may be accessed and utilized by server 130, such as a database server, a hard disk drive, or a flash memory. In other embodiments, storage device 140 can represent multiple storage devices within server 130.

Vocabulary extender 132 utilizes the vocabulary (e.g., vocabulary 142) of a DSL and annotations in the vocabulary to create an extended vocabulary. In one embodiment, vocabulary extender 132 identifies annotations in vocabulary 142 that are associated with operators in the DSL, which vocabulary extender 132 utilizes to create an extended vocabulary. For example, vocabulary extender 132 identifies an annotation of "cheaper" associated with the type "car" attribute. Then, vocabulary extender 132 adds a derived operator of "cheaper" in the creation of the extended vocabulary.

Vocabulary 142, stored in storage device 140, is associated with a DSL and includes words, phrases, their associated meanings, and other data that the DSL utilizes. A domain vocabulary, such as vocabulary 142, is a set of terms to describe objects of a domain (e.g., associated with a DSL). Objects are instances of concepts such as 'Car,' 'Color,' 'City,' 'Country.' Each concept may have one or more attributes of given types, which are concepts or primitive types such as number or string. For example the concept 'Car' may have two attributes of type number, namely 'price' and 'speed,' as well as an attribute 'color' of type 'Color'. Each instance of a concept has a value for each attribute of the concept. For example, the instance of concept 'Car,' named 'the sports car,' has a value of 'Green' for the attribute 'color.' Additionally, a concept may have operators that take instances of the concept as arguments and that result into values of a given primitive type such as number or Boolean (i.e. a type for the truth values true and false). An example is a containment operator that returns true if the city described by a first argument of type 'City' is in the country described by a second argument of type 'Country,' and that returns false otherwise. A DSL may be based on a given vocabulary (e.g., vocabulary 142) and contain expressions for the different vocabulary elements. The expressions can describe instances of concepts, attribute values of the instances, and the results of applying operators from the vocabulary.

A vocabulary can be defined utilizing a graphical editor, a DSL for defining vocabularies, an extensible markup language (XML) format, etc. Each of the annotations may be a text of a predefined form, which depends on the type of the contraction and which is associated to a concept or attribute. For example, the attribute 'price' of concept 'Car' may have the following annotation for defining the cheaper-than operator: "defines order 'is cheaper than' using 'is less than'." Similarly, the attribute 'speed' of concept 'Car' may have the annotation for defining the faster-than operator: "defines order 'is faster than' using 'is more than'." Additional forms of contractions can be specified by other forms of texts.

Figure 3A:
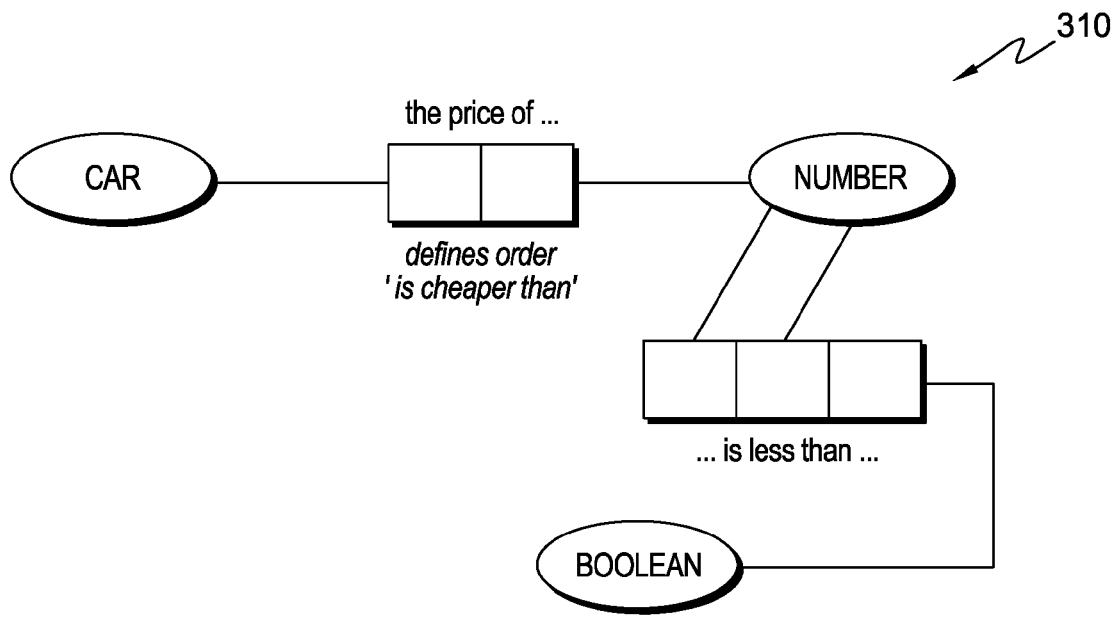
FIG. 3A is an example depiction of an object-role-modeling diagram for a vocabulary of a DSL, in accordance with an embodiment of the present invention.

In an example embodiment, FIG. 3A depicts original vocabulary 310 for a DSL in the form of an object-role-modeling diagram. Original vocabulary 310 depicts types of "car," "number," and "Boolean," a binary relationship "price" between "car" and "number," and a ternary relationship "is less than" between "number," and "Boolean." The price relationship has an annotation indicating that the relationship represents a "cheaper" relationship over cars. Vocabulary extender 132 utilizes the annotation and adds a ternary relationship between "car" and "Boolean," creating extended vocabulary 350 (depicted in FIG. 3B).

Figure 3B:
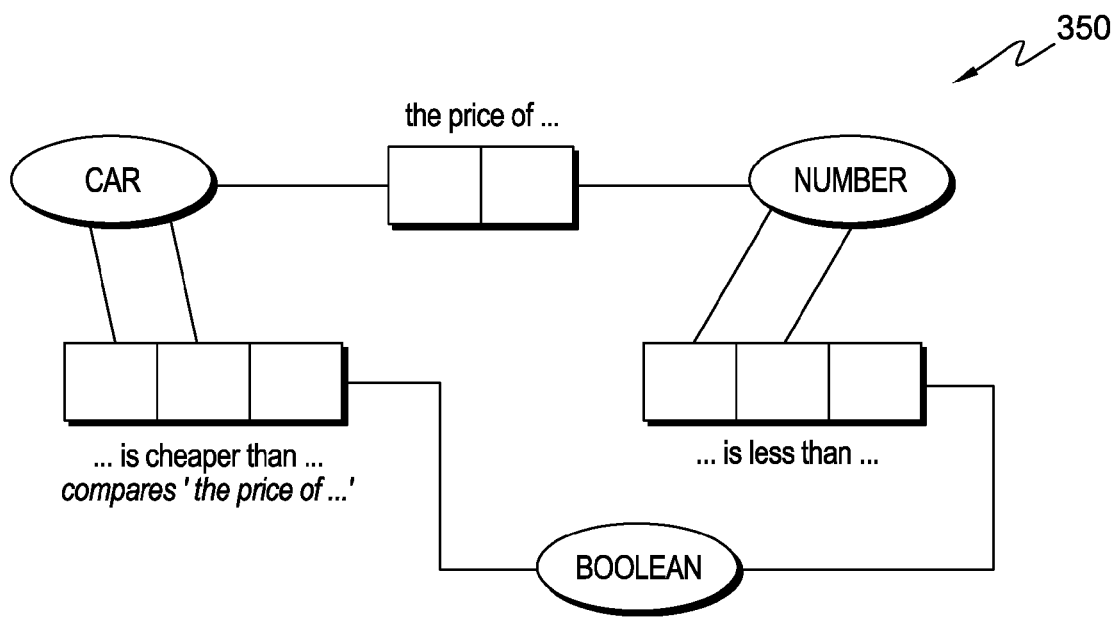
FIG. 3B is an example depiction of an object-role-modeling diagram for an extended vocabulary of a DSL, in accordance with an embodiment of the present invention.

In another example embodiment, FIG. 3B depicts extended vocabulary 350 for a DSL in the form of an object-role-modeling diagram. Extended vocabulary 350 depicts types of "car," "number," and "Boolean," a binary relationship "price" between "car" and "number," and a ternary relationship "is less than" between "number," and "Boolean" (similarly to original vocabulary 310). Extended vocabulary 350 includes a ternary relationship of "is cheaper than" between "car" and "Boolean" that is based on the "cheaper" annotation in original vocabulary 310.

DSL extender 134 creates grammar rules for a vocabulary of a DSL, which are added to the grammar of the DSL (e.g., grammar 144). Grammar 144, stored in storage device 140, is associated with a DSL and includes grammar rules for statements in the DSL. The grammar of a DSL with a vocabulary (e.g., grammar 144) may have a non-terminal symbol for each concept representing an expression that evaluates to an instance of the concept. Grammar 144 may have grammar rules for formulating expressions that represent the attribute values or result of operations. In various embodiments, the grammar rules for terms of vocabulary 142 can directly be derived from vocabulary 142 in a generic way and need not be specified explicitly. The grammar rules in grammar 144 that are derived from a vocabulary extend the grammar (e.g., via DSL extender 134) of an ordinary DSL without vocabulary.

In one embodiment, DSL extender 134 utilizes the extended vocabulary of a DSL (created by vocabulary extender 132) and the grammar of a DSL (e.g., grammar 144) to determine and create grammar rules to add to the grammar of the DSL. DSL extender 134 adds grammar rules to the grammar of the DSL (e.g., grammar 144) based on which parts of the vocabulary (e.g., vocabulary 142) are extended. In an example embodiment, a user defines a vocabulary (e.g., vocabulary 142) utilizing a graphical editor that has commands for declaring concepts, attributes, and operators. By defining such a vocabulary, the user is able to extend, (e.g., via DSL extender 134) a given rule language to a custom domain without needing to manually write new grammar rules. DSL extender 134 creates grammar rules to add to grammar 144 based on extended vocabulary 350. Extended vocabulary 350 includes additional relationships (compared to original vocabulary 310), and DSL extender 134 adds grammar rules to grammar 144 corresponding to the additional relationships in extended vocabulary 350.

Given a vocabulary (e.g., vocabulary 142) and an ordinary DSL that does not include a vocabulary, DSL extender 134 extends the grammar of the DSL by a grammar rule for each vocabulary element. For each concept of the vocabulary, DSL extender 134 generates a non-terminal symbol for expressions that evaluate to instances of this concept. For example, DSL extender 134 generates the symbols <car>, <color>, <city>, <country> for the expressions related to the concepts 'Car,' 'Color,' 'City,' 'Country.' These symbols complement existing non-terminal symbols representing primitive values such as numbers, Boolean truth values, strings, etc. In addition, DSL extender 134 generates grammar rules for accessing attribute values. The left-hand side of such a rule is the non-terminal system for the attribute type. The right-hand side consists of an article, the attribute name as defined in the vocabulary, the partitive article "of," and the non-terminal system for the concept that declares the attribute. For example, '<number>::=the price of <car>,' '<number>::=the speed of <car>,' and '<color>::=the color of <car>.' In additional embodiments, DSL extender 134 generates grammar rules for applying operators from the vocabulary. The left-hand side of such a rule is the non-terminal system for the result type of the operator. The right-hand side may use an infix notation and consist of the expression for the first argument, the operator symbol, and the expression for the second argument.

DSL parser 136 is a standard parsing program or application that is capable of parsing DSL statements. DSL parser 136 utilizes the extended grammar of the DSL (e.g., from DSL extender 134), the extended DSL vocabulary (e.g., from vocabulary extender 132), and DSL statements, which can include contracted statements.

Parsing program 200 determines an expanded AST based on a DSL statement that includes contracted statements, in accordance with embodiments of the present invention. In various embodiments, parsing program 200 utilizes DSL parser 136 to parse DSL statements, in accordance with various embodiments of the present invention. In one embodiment, parsing program 200 utilizes DSL parser 136 to parse a DSL statement (e.g., a statement in DSL statements 146) that includes contractions, and parsing program 200 annotates the resulting AST nodes corresponding to the contractions. DSL statements 146, stored in storage device 140, includes the DSL statements that server 130 has received (e.g., from computing device 120).

Figure 2:
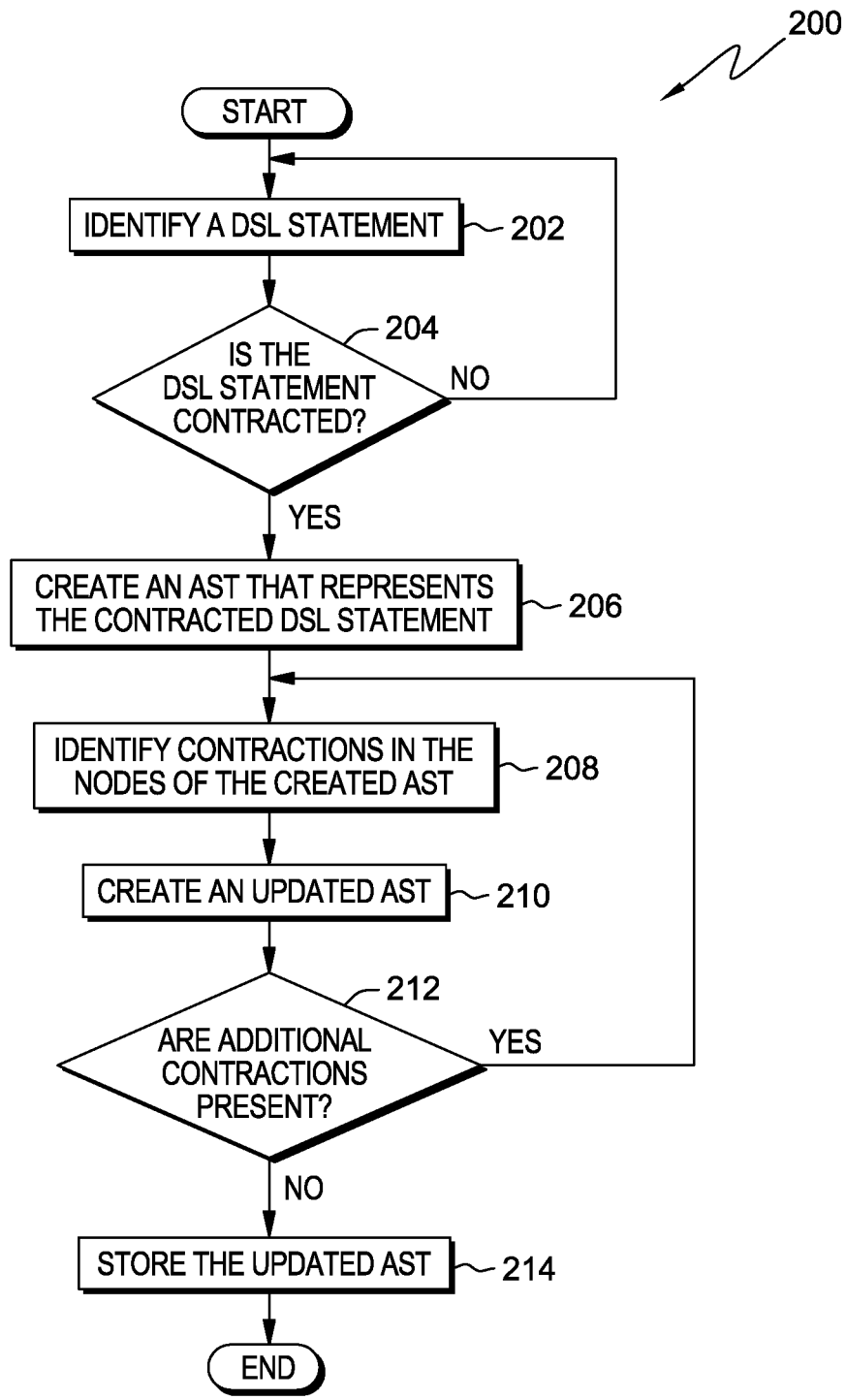
FIG. 2 is a flowchart depicting operational steps of a program for determining an expanded AST based on a domain-specific language (DSL) statement that includes contracted statements, in accordance with an embodiment of the present invention.

FIG. 2 is a flowchart depicting operational steps of parsing program 200, a program for determining an expanded AST based on a DSL statement that includes contracted statements, in accordance with embodiments of the present invention.

In step 202, parsing program 200 identifies a DSL statement. In one embodiment, parsing program 200 accesses and identifies a DSL statement from DSL statements 146, stored in storage device 140. In another embodiment, parsing program 200 identifies a DSL statement received from computing device 120.

In decision step 204, parsing program 200 determines whether the identified DSL statement is a contracted statement. In one embodiment, parsing program 200 determines whether a DSL statement (identified in step 202) includes contractions and/or shortened phrases (e.g., utilizing semantic annotations). In another embodiment, parsing program 200 receives an indication that the DSL statement is a contracted statement. In response to determining that the identified DSL statement is not a contracted statement (decision step 204, "no" branch), parsing program 200 returns to step 202. In an example, parsing program 200 identifies a DSL statement of "the limousine is cheaper than the sports car" (in step 202). Then, parsing program 200 analyzes the identified DSL statement utilizing semantic annotations of vocabulary 142 and determines that the identified DSL statement is a contracted statement (decision step 204, "yes" branch). In this example, parsing program 200 identifies "is cheaper than" as a contracted phrase in the identified DSL statement.

Figure 4A:
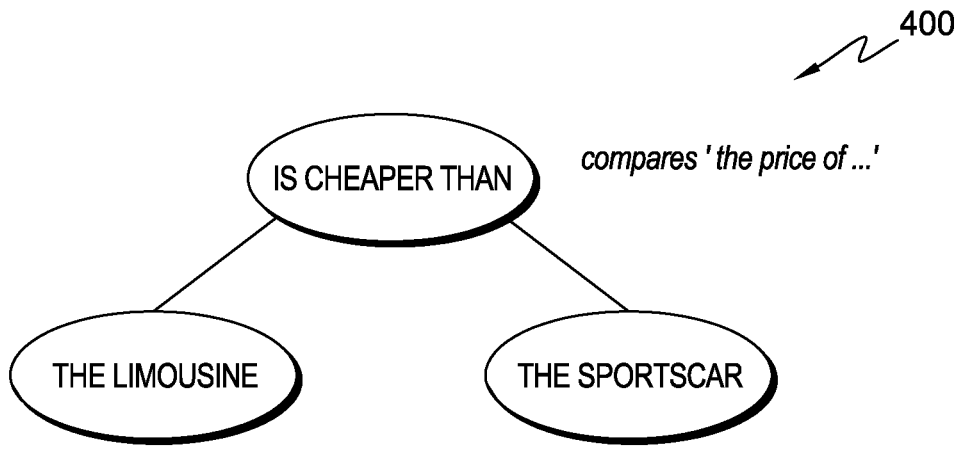
FIGS. 4A and 4B are example depictions of an abstract syntax tree (AST), in accordance with an embodiment of the present invention.

In step 206, parsing program 200 creates an AST that represents the contracted DSL statement. More specifically, in response to determining that the identified DSL statement is a contracted statement (decision step 204, "yes" branch), parsing program 200 creates an AST that represents the contracted DSL statement (identified in step 202). In one embodiment, parsing program 200 utilizes DSL extender 134 and grammar 144 (including grammar extensions) to parse the identified DSL statement (identified in step 202 and determined to be a contracted statement in decision step 204) and create an AST that represents the DSL statement. In an example embodiment, FIG. 4A depicts contracted AST 400. Parsing program 200 creates contracted AST (in step 206) based on the contracted identified DSL statement of "the limousine is cheaper than the sports car." Parsing program 200 utilizes annotations and extensions in vocabulary 142 to include an annotation that indicates the contraction of the node in the AST corresponding to "is cheaper than" with the annotation of "compares 'the price of . . . '" in contracted AST 400. The annotation provides an indication (from vocabulary 142) that the contraction in contracted AST 400 is associated with a price operator.

In step 208, parsing program 200 identifies contractions in the nodes of the created AST. In one embodiment, parsing program 200 identifies one or more contractions in the created AST (created in step 206). For example, parsing program 200 utilizes semantic annotations (e.g., provided in vocabulary 142) to identify contracted phrases (e.g., shortened forms of phrases in a DSL statement). In an example, parsing program 200 analyzes contracted AST 400 (depicted in FIG. 4A) and utilizes the sematic annotation of "compares 'the price of . . . '" to identify that the corresponding AST node of "is cheaper than" is a contracted phrase. In various embodiments, parsing program 200 can identify a plurality of contractions in an AST in a plurality of locations within the AST.

Figure 4B:
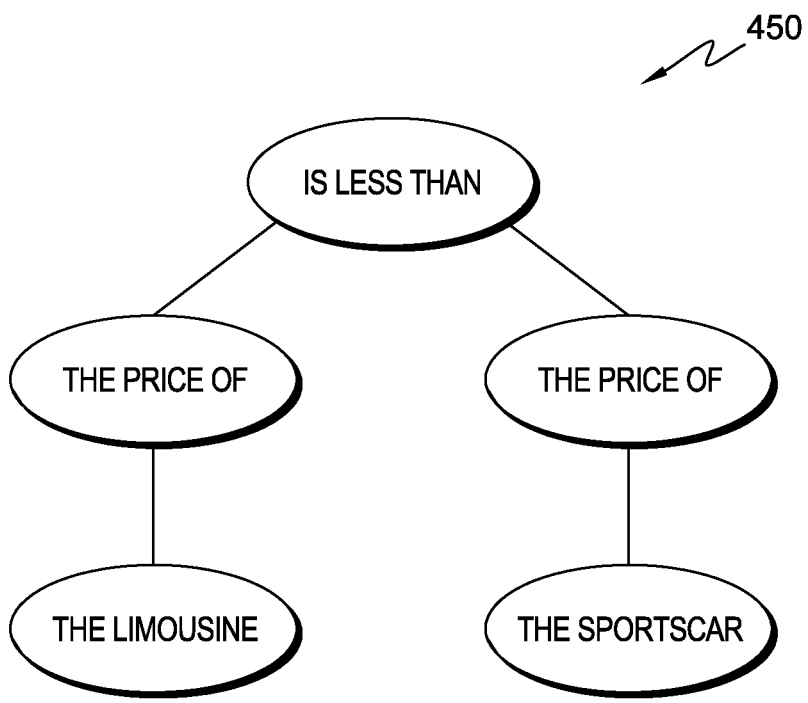

In step 210, parsing program 200 creates an updated AST. In one embodiment, parsing program 200 creates an updated AST that resolves and expands the identified contractions (from step 208). In an example embodiment, when resolving contractions, parsing program 200 applies the semantic annotations that correspond to the nodes in the AST that include a contracted phrase. The annotations facilitate expansion of the AST into an expanded AST, in which the identified contractions (from step 208) are expanded. Parsing program 200 replaces the identified contractions in the AST by expanding the contractions according to vocabulary 142, which results in an updated, expanded AST. For example, parsing program 200 utilizes the semantic annotation of "compares 'the price of . . . '" on the node in contracted AST 400 of "is cheaper than," vocabulary 142, and grammar 144 to create an expanded AST. FIG. 4B depicts expanded AST 450, which is a contraction-free AST. In an example embodiment, parsing program 200 processes contracted AST 400, expands the contractions in contracted AST 400, and utilizes the expanded contractions to create expanded AST 450. In this example embodiment, expanded AST 450 is representative of a DST statement of "the price of the limousine is less than the price of the sports car." In various embodiments, parsing program 200 creates an AST (e.g., expanded AST 450) that is capable of being utilized by the applications and/or engines associated with the DSL.

In decision step 212, parsing program 200 determines whether additional contractions are present in the updated AST. In one embodiment, parsing program 200 analyzes (e.g., utilizing semantic annotations) the updated AST (created in step 210) to determine whether the updated AST includes any additional contracted phrases. In various embodiments, if the original AST (e.g., created in step 206) included contractions within contractions (e.g., composed contractions or nested contractions), then parsing program 200 can determine that the updated AST does still include one or more contractions (decision step 212, "yes" branch). In response to determining that the updated AST does include one or more additional contractions, parsing program 200 returns to step 208.

In step 214, parsing program 200 stores the updates AST. In one embodiment, in response to determining that no additional contractions are present in the updates AST (decision step 212, "no" branch), parsing program 200 stores the updated AST (e.g., in storage device 140). The stored AST is capable of being accessed and utilized by desired applications of systems. In another embodiment, parsing program 200 sends the updates AST a corresponding application for processing.

In a first example embodiment, a concept such as a "car" may have an attribute "price" of a type integer. Grammar 144 can include a construction for comparing two expressions of type integers (e.g., <expr> is less than <expr>). Given two cars called "limousine" and "sports car" in vocabulary 142, the corresponding DSL is capable of accepting a DSL statement of "the price of the limousine is smaller than the price of the sports car." Vocabulary 142 and grammar 144 include information that permits a semantic annotation of the attribute "price" to indicate that the price attribute represents an order called "cheaper" on cars, which permits a contracted phrase of "the limousine is cheaper than the sports car." Parsing program 200 uses the semantic annotation to recognize the contraction and produce an AST (e.g., expanded AST 450) corresponding to the expanded DSL statement (i.e., "the price of the limousine is smaller than the price of the sports car").

In a second example embodiment, a concept such as "event" may have an attribute "time" representing points in time. Grammar 144 can include a construction for comparing two points in time, and the corresponding DSL is capable of accepting a DSL statement of "the time of the computer purchase event is before the time of the car purchase event." Vocabulary 142 and grammar 144 include information that permits a semantic annotation of the concept "event" to indicate that the attribute "time" defines a temporal aspect of the concept, which permits an expression of type "event" can be used where a time point is expected. In this embodiment, "the computer purchase event is before the car purchase event" is a potential contracted DSL statement. Parsing program 200 utilizes the semantic annotation to recognize the contraction and produce an AST corresponding to the expanded DSL statement (i.e., "the time of the computer purchase event is before the time of the car purchase event").

In a third example embodiment, vocabulary 142 can provide attributes for direct relationships (e.g., ownership relationships, transitive possessive relationships, etc.). Indirect relationships can be expressed by paths and statements that can be verbose, for example, "the city of the address of the shop of the purchase event is in the United Kingdom." If vocabulary 142 and grammar 144 include a unique path from the source concept "purchase event" to the target concept "address," then the DSL statement can be contracted. In this example, the DSL statement can be contracted to "the city of the purchase event is in the United Kingdom." Parsing program 200 can recognize the contraction utilizing grammar rules for attribute accesses in grammar 144. In additional embodiments, different forms of contractions (e.g., temporal relationships, direct relationships, etc.) can be combined together.

Figure 5:
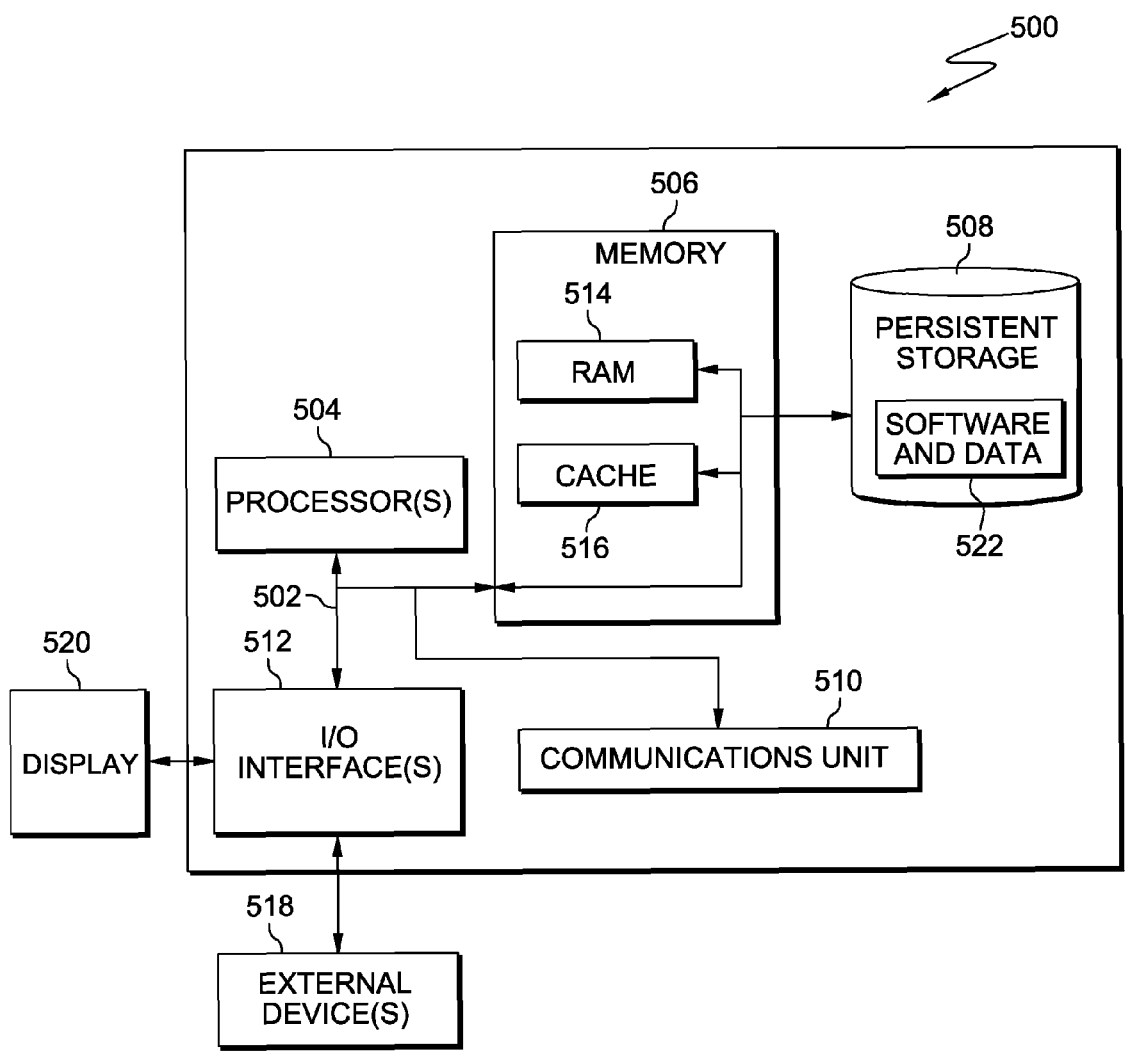
FIG. 5 depicts a block diagram of components of a computing system representative of the client device and server of FIG. 1, in accordance with an embodiment of the present invention.

FIG. 5 depicts a block diagram of components of computer 500, which is representative of client device 120 and server 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media. Software and data 522 are stored in persistent storage 508 for access and/or execution by processors 504 via one or more memories of memory 506. With respect to client device 120, software and data 522 includes application 122. With respect to server 130, software and data 522 includes vocabulary 132, DSL extender 134, DSL parser 136, parsing program 200, vocabulary 142, grammar 144, and DSL statements 146.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 may include one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data 522 can be stored on such portable computer readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for parsing a domain-specific language (DSL) statement, the method comprising:
    accessing, by one or more processors, a DSL statement that includes contracted phrases;
    identifying, by one or more processors, one or more contracted phrases in the DSL statement utilizing an annotated domain vocabulary for a DSL associated with the DSL statement and grammar rules for the DSL;
    determining, by one or more processors, expanded phrases corresponding to the identified one or more contracted phrases based on the annotated domain vocabulary and the grammar rules;
    creating, by one or more processors, an expanded abstract syntax tree (AST) that is representative of the DSL statement with the determined expanded phrases replacing the identified one or more contracted phrases; and
    identifying, by one or more processors, operators in the DSL statement that are associated with annotations in the annotated domain vocabulary; and
    determining, by one or more processors, extensions to add to the annotated domain vocabulary based on the identified operators.

2. The method of claim 1, wherein the identifying one or more contracted phrases in the DSL statement utilizing the annotated domain vocabulary for the DSL associated with the DSL statement and grammar rules for the DSL comprises:
    creating, by one or more processors, an AST that is representative of the DSL statement that includes contracted phrases; and
    identifying, by one or more processors, one or more contracted phrases in the created AST utilizing the annotated domain vocabulary for the DSL and the grammar rules for the DSL.

3. The method of claim 2, wherein the created AST includes semantic annotations that correspond to nodes in the created AST that include a contracted phrase.

4. The method of claim 1, further comprising:
    determining, by one or more processors, whether the expanded AST includes any contracted phrases; and
    responsive to determining that the expanded AST does include contracted phrases, identifying, by one or more processors, one or more contracted phrases in the expanded AST utilizing the annotated domain vocabulary for the DSL and the grammar rules for the DSL.

5. The method of claim 1, wherein the determining expanded phrases corresponding to the identified one or more contracted phrases based on the annotated domain vocabulary and the grammar rules, further comprises:
    expanding, by one or more processors, the one or more identified contracted phrases according to the domain vocabulary for the DSL.

6. The method of claim 1, further comprising:
    determining, by one or more processors, one or more rules to add to the grammar rules for the DSL based on the determined extensions to add to the annotated domain vocabulary.

7. A computer program product for parsing a domain-specific language (DSL) statement, the computer program product comprising:
    one or more computer readable storage media and program instructions stored on the one or more computer readable storage media, the program instructions comprising:
    program instructions to access a DSL statement that includes contracted phrases;
    program instructions to identify one or more contracted phrases in the DSL statement utilizing an annotated domain vocabulary for a DSL associated with the DSL statement and grammar rules for the DSL;

program instructions to determine expanded phrases corresponding to the identified one or more contracted phrases based on the annotated domain vocabulary and the grammar rules;

program instructions to create an expanded abstract syntax tree (AST) that is representative of the DSL statement with the determined expanded phrases replacing the identified one or more contracted phrases; and program instructions to identify operators in the DSL statement that are associated with annotations in the annotated domain vocabulary; and program instructions to determine extensions to add to the annotated domain vocabulary based on the identified operators.

8. The computer program product of claim 7, wherein the program instructions to identify one or more contracted phrases in the DSL statement utilizing the annotated domain vocabulary for the DSL associated with the DSL statement and grammar rules for the DSL comprise program instructions to:

create an AST that is representative of the DSL statement that includes contracted phrases; and identify one or more contracted phrases in the created AST utilizing the annotated domain vocabulary for the DSL and the grammar rules for the DSL.

9. The computer program product of claim 8, wherein the created AST includes semantic annotations that correspond to nodes in the created AST that include a contracted phrase.

10. The computer program product of claim 7, further comprising program instructions, stored on the one or more computer readable storage media, to:

determine whether the expanded AST includes any contracted phrases; and responsive to determining that the expanded AST does include contracted phrases, identify one or more contracted phrases in the expanded AST utilizing the annotated domain vocabulary for the DSL and the grammar rules for the DSL.

11. The computer program product of claim 7, wherein the program instructions to determine expanded phrases corresponding to the identified one or more contracted phrases based on the annotated domain vocabulary and the grammar rules, further comprise program instructions to:

expand the one or more identified contracted phrases according to the domain vocabulary for the DSL.

12. The computer program product of claim 7, further comprising program instructions, stored on the one or more computer readable storage media, to:

determine one or more rules to add to the grammar rules for the DSL based on the determined extensions to add to the annotated domain vocabulary.

13. A computer system parsing a domain-specific language (DSL) statement, the computer system comprising:
one or more computer processors;
one or more computer readable storage media; and
program instructions stored on the computer readable storage media for execution by at least one of the one or more processors, the program instructions comprising:

program instructions to access a DSL statement that includes contracted phrases;

program instructions to identify one or more contracted phrases in the DSL statement utilizing an annotated domain vocabulary for a DSL associated with the DSL statement and grammar rules for the DSL;

program instructions to determine expanded phrases corresponding to the identified one or more contracted phrases based on the annotated domain vocabulary and the grammar rules;

program instructions to create an expanded abstract syntax tree (AST) that is representative of the DSL statement with the determined expanded phrases replacing the identified one or more contracted phrases; and program instructions to identify operators in the DSL statement that are associated with annotations in the annotated domain vocabulary; and program instructions to determine extensions to add to the annotated domain vocabulary based on the identified operators.

14. The computer system of claim 13, wherein the program instructions to identify one or more contracted phrases in the DSL statement utilizing the annotated domain vocabulary for the DSL associated with the DSL statement and grammar rules for the DSL comprise program instructions to:

create an AST that is representative of the DSL statement that includes contracted phrases; and identify one or more contracted phrases in the created AST utilizing the annotated domain vocabulary for the DSL and the grammar rules for the DSL.

15. The computer system of claim 13, further comprising program instructions, stored on the computer readable storage media for execution by at least one of the one or more processors, to:

determine whether the expanded AST includes any contracted phrases; and responsive to determining that the expanded AST does include contracted phrases, identify one or more contracted phrases in the expanded AST utilizing the annotated domain vocabulary for the DSL and the grammar rules for the DSL.

16. The computer system of claim 13, wherein the program instructions to determine expanded phrases corresponding to the identified one or more contracted phrases based on the annotated domain vocabulary and the grammar rules, further comprise program instructions to:

expand the one or more identified contracted phrases according to the domain vocabulary for the DSL.

17. The computer system of claim 13, further comprising program instructions, stored on the computer readable storage media for execution by at least one of the one or more processors, to:

determine one or more rules to add to the grammar rules for the DSL based on the determined extensions to add to the annotated domain vocabulary.

\* \* \* \* \*